United States Patent [19]

Millward et al.

[11] 4,271,717
[45] Jun. 9, 1981

[54] AXLE ASSEMBLIES

[75] Inventors: Thomas H. Millward, Sutton Coldfield; David G. Wylie, Erdington; Philip C. Clarke, Dostill, all of England

[73] Assignee: GKN Axles Limited, England

[21] Appl. No.: 56,328

[22] Filed: Jul. 10, 1979

[51] Int. Cl.³ .................... F16H 57/04; F01M 11/02
[52] U.S. Cl. .................... 74/467; 74/606 R; 184/11 R
[58] Field of Search .................... 74/607, 606, 467; 415/90; 308/85 B, 127; 184/6.12, 11 A, 11 B

[56] References Cited

U.S. PATENT DOCUMENTS

| 1,775,623 | 9/1930 | Morgan | 74/467 X |
|---|---|---|---|
| 2,147,145 | 2/1939 | Carlson et al. | 184/11 A |
| 2,241,870 | 5/1941 | Scribner | 415/90 X |
| 2,701,972 | 2/1955 | Hoffman | 74/607 |
| 2,929,468 | 3/1960 | Steiner | 184/6.12 |
| 3,138,222 | 6/1964 | Dames et al. | 184/11 A |
| 3,153,464 | 10/1964 | Nelson et al. | 74/467 X |
| 3,162,269 | 12/1964 | Reed | 74/467 X |
| 3,182,527 | 5/1965 | Bryan | 74/467 X |
| 3,441,106 | 4/1969 | Taylor et al. | 74/607 X |
| 3,502,177 | 3/1970 | Christie | 184/6.12 X |
| 3,529,698 | 9/1970 | Nelson | 184/6.12 |
| 3,545,568 | 12/1970 | Lacoste | 74/467 X |
| 3,635,578 | 1/1972 | Wagner | 415/90 |
| 3,838,751 | 10/1974 | Brown | 184/6.12 |
| 3,887,037 | 6/1975 | Haluda et al. | ·184/6.12 |
| 4,018,097 | 4/1977 | Ross | 74/467 |
| 4,175,643 | 11/1979 | Jenkins | 74/467 X |
| 4,227,427 | 10/1980 | Dick | 74/467 |

FOREIGN PATENT DOCUMENTS 514248 11/1939 United Kingdom .................. 74/606 A Primary Examiner—C. J. Husar
Assistant Examiner—Mark A. Daugherty
Attorney, Agent, or Firm—Merriam, Marshall & Bicknell

[57] ABSTRACT

An axle assembly with crown-wheel and pinion gearing and lubrication of the pinion bearings by two passages having entrances disposed close to the periphery of a rotary element, to remove lubricant from a film entrained by the element from a supply of lubricant in the bottom of the housing in the gearing, the passages directing lubricant to a chamber and then to the bearings with one or other passage effective despite changed orientation or direction of operation of the assembly.

2 Claims, 4 Drawing Figures

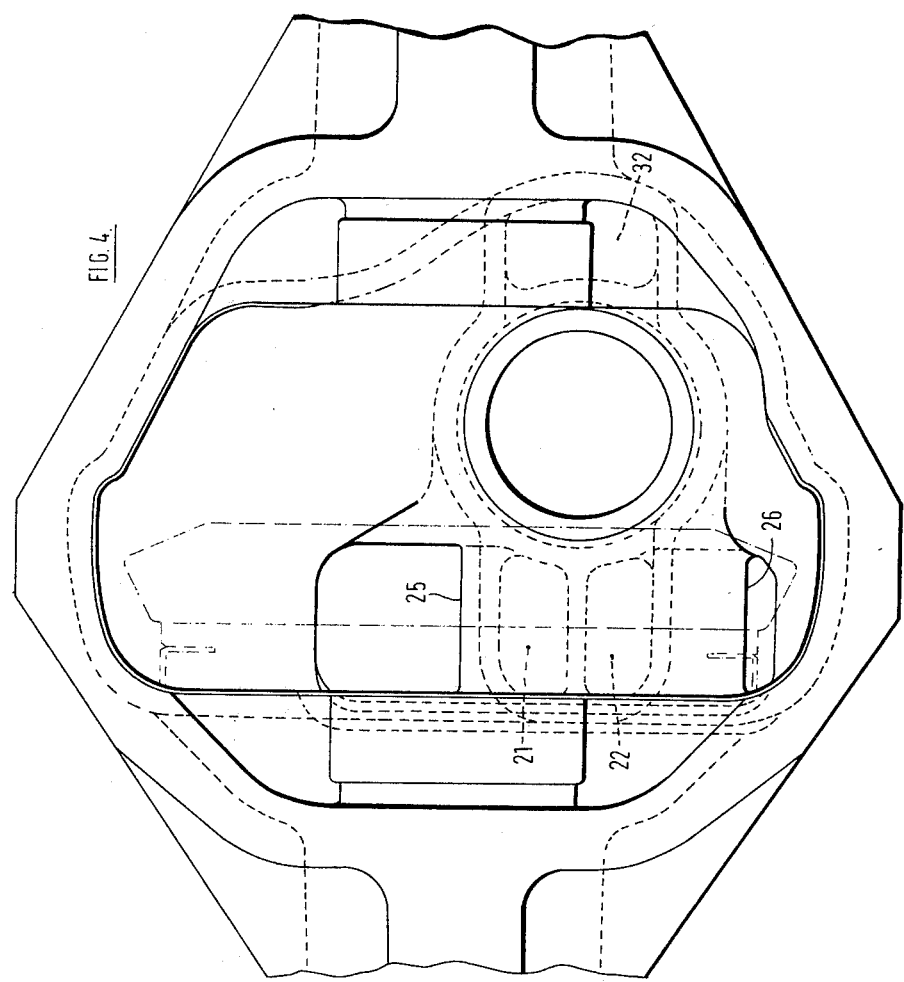

AXLE ASSEMBLIES

BACKGROUND TO THE INVENTION

1. Field of the Invention

This invention relates to axle assemblies of the kind comprising a housing in which is disposed a crown wheel and pinion gearing providing for drive from an input element connected to the pinion to an output element or elements connected directly or by way of a differential gearing to the crown wheel, the input element and pinion being supported by bearings carried in a part of the housing. Such an assembly will hereafter be referred to as an assembly of the kind specified. The invention has been developed in relation to assemblies of the kind specified wherein the crown wheel and pinion gearing is of the hypoid type, in which the axis of rotation of the pinion is offset from the axis of rotation of the crown wheel, but it is also applicable to assemblies of the spiral bevel type in which the rotational axes of the crown wheel and pinion intersect.

Satisfactory service of an axle assembly of the kind specified is dependent on, among other factors, the maintenance of an adequate supply of lubricant to the bearings which support the input element connected to the pinion. It is usual to provide a quantity of liquid lubricant within the housing of the assembly, and supply of such lubricant to the bearings must then be provided for. In the case of an assembly utilising hypoid gearing, in an installation in which the axis of rotation of the pinion is beneath the axis of rotation of the crown wheel, it is relatively easy to arrange for lubricant to be delivered to the bearings. This is facilitated by the static lubricant level within the housing generally being somewhere approaching the position of the bearings.

If, however, the same assembly should be used in an orientation in which the axis of rotation of the input element is above that of the crown wheel, e.g. if the assembly were used in a vehicle in which maximum ground clearance is desired, it is more difficult to ensure adequate lubrication of the input element and pinion bearings. If the assembly is required to operate at low speeds only, the problem can be overcome by increasing the static level of lubricant within the housing, but this expedient leads to excessive losses due to churning of lubricant if run at high speeds.

2. Summary of Prior Art

It has been proposed, in British Pat. No. 1,188,863, to provide for lubrication of the input element and pinion bearings by lubricant carried by and thrown from the periphery of the crown wheel due to rotation thereof. By appropriate arrangement of lubricant trapping passages or formations, lubrication can be provided for either orientation of the installed assembly. However, if the vehicle in which the axle is installed is travelling slowly, carrying of lubricant by the pinion and the throwing off of the lubricant therefrom does not occur, and inadequate lubrication can result. There have been many other proposals for lubrication of differential gearing associated with crown wheels in axles in various circumstances, and examples are disclosed typically in British Pat. Nos. 590,867; 1,482,116; 1,448,079; but none is concerned with pinion bearing lubrication, and proposals involving "scraping" of lubricant from a rotating surface by an element which contacts the surface; e.g. British Pat. Nos. 1,172,952 and 1,124,697; we regard as unsatisfactory.

SUMMARY OF THE INVENTION

According to the present invention, we provide an axle assembly of the kind specified wherein there are provided two passages each having an entrance with a formation lying close to the periphery of a rotary lubricant entraining element to remove lubricant from a lubricant film entrained from a quantity of lubricant in said housing on rotation thereof, and to direct such lubricant into the passage, the formations being operative in respective opposite directions of rotation of said element, and said passages providing for delivery of lubricant to the bearings of the input element.

The two passages may extend to and communicate with a chamber disposed substantially level with said input element and from which lubricant can flow to the bearings of the input element.

When an element is rotated in a chamber or casing containing sufficient liquid, such as lubricating oil, to immerse the lower part of the element, the liquid is entrained by and carried on the periphery of the element to produce the effect of a complete peripheral liquid film. The thickness of such film is dependent upon the viscosity of the liquid and the speed of rotation of the element. If a lip or like formation is arranged close to the periphery of the element, and if the film is of sufficient thickness to reach the formation, a wave in the liquid builds up at the formation. A small increase in the speed of rotation of the element will cause the liquid actually to be removed therefrom by the formation, and the present invention utilises this effect. The formation need not touch the rotary element, which would be undesirable.

The rotary lubricant entraining element may comprise a member secured to the crown wheel and affording a generally cylindrical surface with which the passage entrances are in alignment.

BRIEF DESCRIPTION OF DRAWINGS

These and other features of the invention will now be described by way of example with reference to the accompanying drawings, of which

FIG. 4 is a diagrammatic view in the direction of arrow 4 on FIG. 1

DESCRIPTION OF PREFERRED EMBODIMENT

Figure 1:
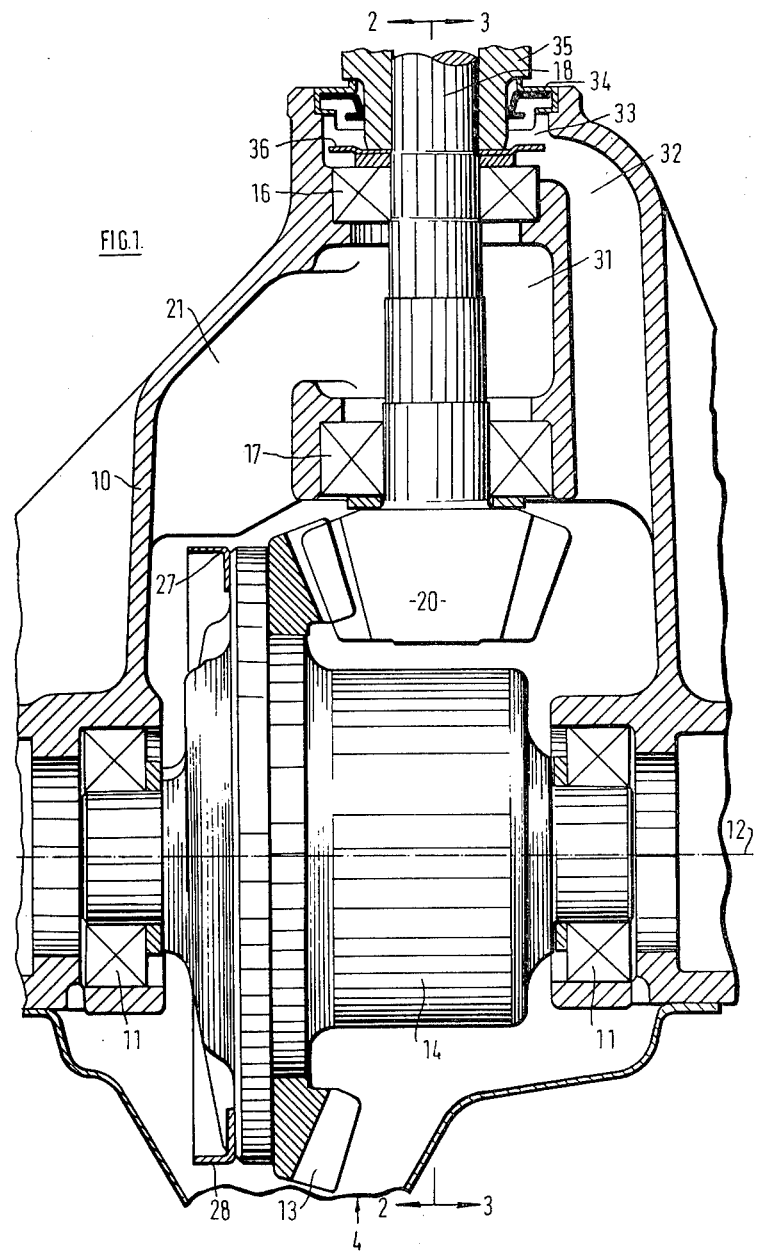
FIG. 1 is a horizontal section through part of an axle assembly embodying the invention
Figure 2:
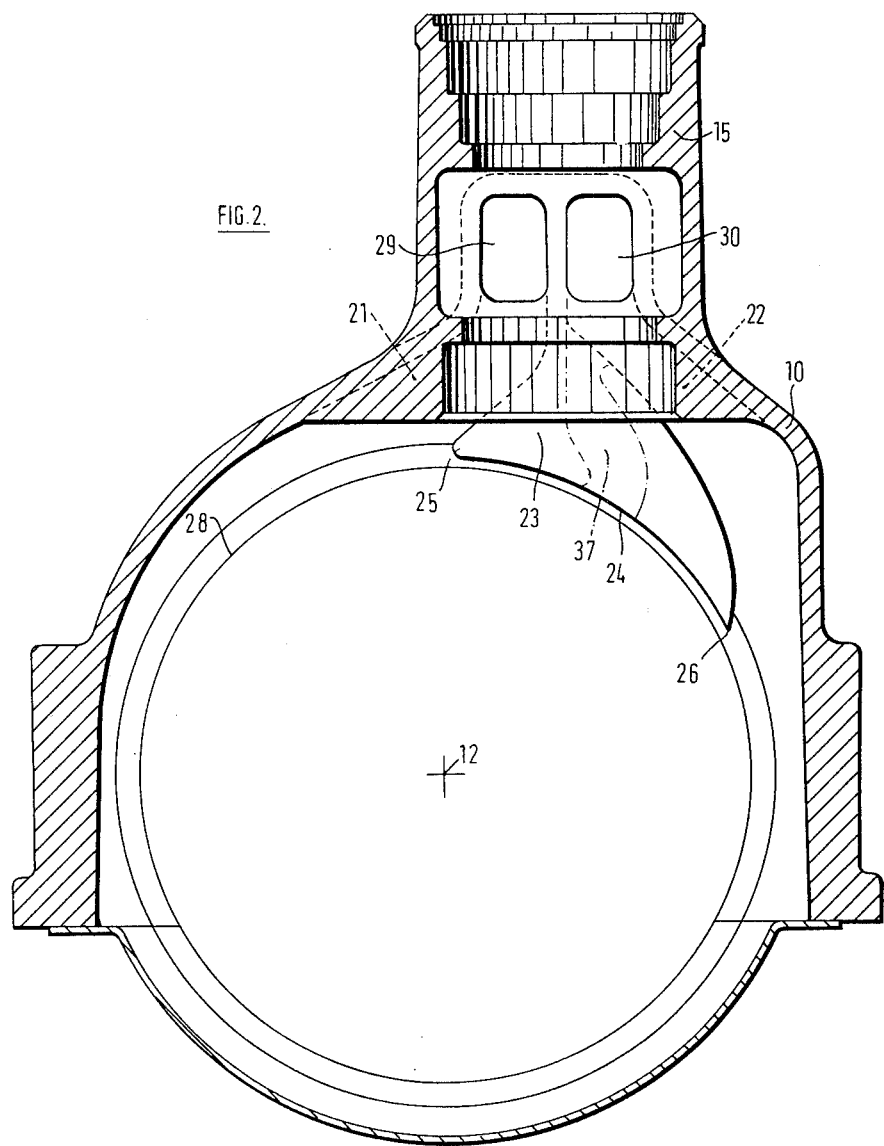
FIGS. 2 and 3 are respectively sections of 2—2 and 3—3 of FIG. 1
Figure 3:
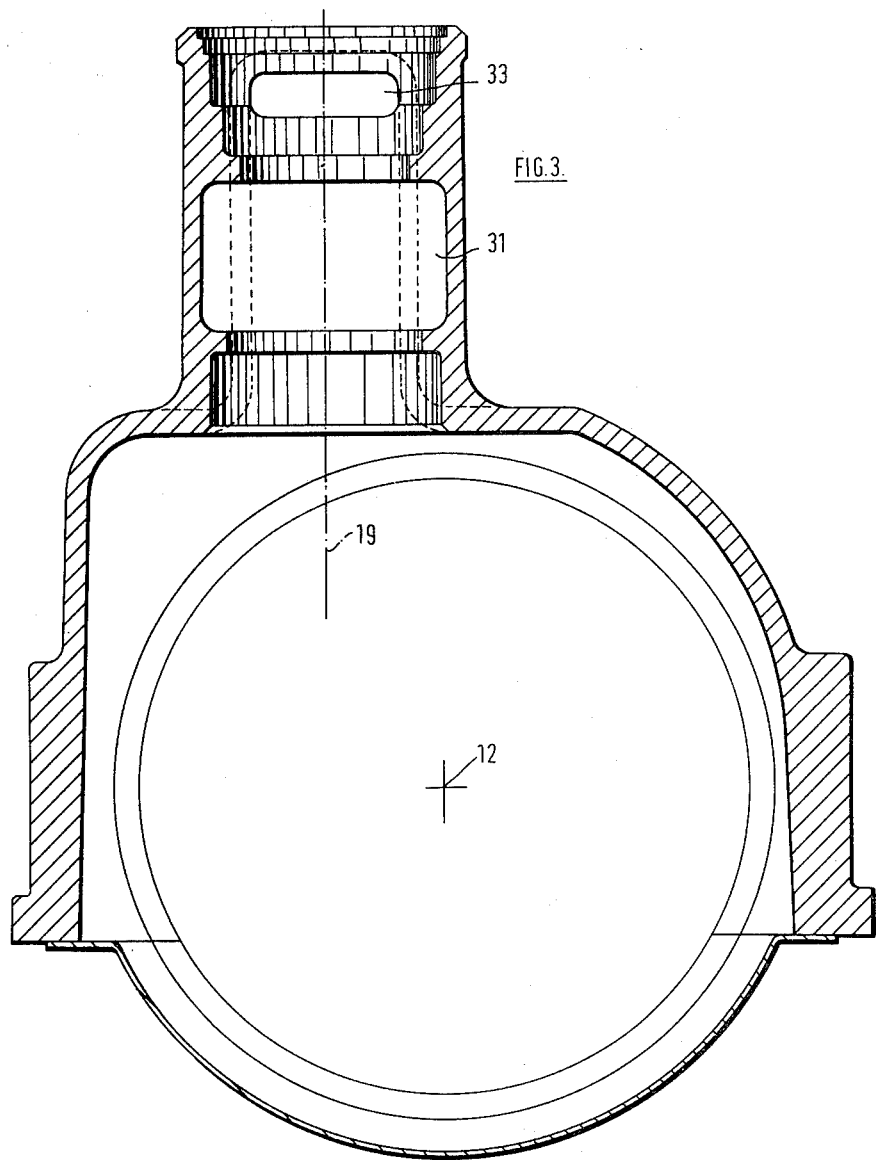

Referring to the drawings, there is illustrated an axle assembly comprising a casing 10 in which is mounted, by bearings 11 for rotation about an axis 12, a crown wheel 13. The crown wheel 13 may be connected to two laterally extending output elements, also rotatable about axis 12, through the intermediary of a differential gearing shown in outline at 14. In a forward extension 15 of the housing 10 is mounted, by a front bearing 16 and rear bearing 17, an input shaft 18 rotatable about axis 19 and carrying a pinion 20. The crown wheel and pinion gearing is of the hypoid type, the axes 12 and 19 being offset from one another.

In one side of the forward extension 15 of the casing 10 are provided two passages 21, 22. These passages have their outer walls defined by the casing of the axle assembly, and are separated by a web 23 which has an end wall 24 which closely follows the cylindrical periphery of crown wheel 13 and a member 27 secured thereto and has lips 25, 26 which define the entrances of passages 21, 22 respectively, closely approaching and in alignment with the member 27.

The passages 21, 22 extend forwardly and open, by apertures 29, 30, into a chamber 31 which is of annular form surrounding the input element 18 and between the bearings 16, 17. On the opposite side of the forward extension 15 of the casing to the passages 21 and 22 is provided a further passage 32 which extends forwardly to an annular space 33 in front of bearing 16. An oil seal 34 engages an input sleeve 35 on the end of input element 18, and an oil thrower ring 36 is provided on the input element 18 between bearing 16 and sleeve 35.

In use of the assembly, the casing will contain a quantity of lubricating oil sufficient to immerse the lower most part of the crown wheel 13 and member 27 secured thereto. Upon rotation of the crown wheel, the oil will be carried round thereon and on the member 27 in a peripheral film, the thickness of such film increasing as the speed of rotation increases. When the thickness of film is sufficient to meet the lip 25 or lip 26, depending upon the direction of rotation of the crown wheel, the oil will initially build up to a wave in front of the lip and ultimately be broken away from the crown wheel to enter the passage 21 or 22. The oil travels through passage 21 or passage 22 to enter chamber 31, and thence flows forwardly through bearing 16 and rearwardly through bearing 17 to return to the main part of the casing, either directly from bearing 17 or by way of passage 32 from bearing 16. The oil thrower ring 36 assists delivery of oil from the front of bearing 16 to the passage 32.

Because the action of lips 25 and 26 at the entrance of passages 21 and 22 is to remove lubricant from the surface film on crown wheel 13 and member 27, this effect is operative for both directions of rotation of the crown wheel, and for orientations of the axle assembly in which the axis of rotation of the input element is above or below the axis of rotation of the crown wheel. The closeness of surface 24 to the surface 28 of member 27, and the closeness of lips 25 and 26 to the member 27, must of course be selected in accordance with the viscosity of lubricant designed to be used in the axle assembly, and the normal range of operating speeds thereof.

In any event, contact of the lips at the entrance to passages 21 and 22 with the crown wheel and its attached member 27 is not necessary.

In a possible modification, a third passage 37 may be provided, having its entrance midway between the entrances of passages 21 and 22. Under certain conditions, this can assist flow of lubricant to the chamber 31. Further, the surface 24 between the lips 25 and 26 need not closely follow the periphery of crown wheel 13 and member 27, but could be relieved since the lips 25 and 26 are effective in themselves in removing lubricant from the film adhering to the crown wheel periphery. Relief of this surface in the formation of the casing 10, e.g. as a casting, can reduce the quantity of machining necessary in order to achieve the required clearance between lips 25 and 26 and the periphery of the crown wheel. If the crown wheel 13 is of suitable shape, the member 27 need not be provided to afford the additional lubricant-entraining surface 28, or, alternatively, a suitable member for lubricant entrainment could be formed integrally with the crown wheel.

I claim:

1. An axle assembly comprising:
   a housing,
   a crown wheel and pinion gearing disposed in said housing,
   an input element connected to said pinion, and supported in an extension of the housing by bearing means, said bearing means including spaced bearings adjacent to and remote from said pinion,
   a differential gearing connected to said crown wheel, said differential gearing including rotary output elements,
   said crown wheel having associated therewith a lubricant entraining element,
   said housing defining a chamber through which said input element extends between the bearings thereof, and two passages each leading into said chamber and having an entrance with a lip lying close to the periphery of said lubricant entraining element for removing lubricant from a film thereof entrained by said element from a quantity of lubricant in said housing, and for directing such lubricant into the respective passage upon rotation of said lubricant entraining element in respective opposite directions,
   said housing further defining in said extension thereof a space through which said element extends on the side of said remote bearing thereof opposite said chamber, and a further passage with an entrance in said space and extending substantially level with said input element to communicate with the housing part containing said crown wheel, and
   the vertical dimension of said entrance of said further passage being less than the vertical dimension of said space, and the lower boundary of said entrance being above the bottom of said space, when the assembly is viewed in elevation in an orientation in which the axes of rotation of said input element and crown wheel are both substantially horizontal, whereby a quantity of lubricant is retained in said space when the assembly is at rest, for lubricating said remote bearing at start-up.

2. An axle assembly according to claim 1 wherein said crown wheel and pinion gearing is of hypoid type with the axis of rotation of said pinion and input element offset from the axis of rotation of said crown wheel, the entrance of one of said passages lies level with a central region of said crown wheel and the passage adjacent said entrance extends at an angle to the tangent to said lubricant entraining element and the entrance of the other of said passages is generally level with the periphery of said crown wheel and the passage adjacent said entrance extends substantially tangentially to the periphery of said lubricant entraining element.

* * * * *